March 7, 1933. C. P. BRODHUN 1,900,792
NONINDUCTIVE CABLE
Filed May 1, 1928

Inventor
CARL P. BRODHUN
By
Attorneys

Patented Mar. 7, 1933

1,900,792

UNITED STATES PATENT OFFICE

CARL P. BRODHUN, OF WILKES-BARRE, PENNSYLVANIA, ASSIGNOR TO THE OKONITE COMPANY, OF PASSAIC, NEW JERSEY, A CORPORATION OF NEW JERSEY

NONINDUCTIVE CABLE

Application filed May 1, 1928. Serial No. 274,263.

This invention relates in general to cables and more particularly has reference to insulated electric cables.

Previous to this time, the cables of this character have generally been encased with metallic armor, such as band steel sheathing, to protect the conductor against accidental mechanical injury and further wrapped with textile protective coverings to resist the deleterious effects of the elements. They have also been encased in terra cotta, wood and metal conduits or have been provided with additional protective sheathing of resilient fibrous or metallic material, or a combination of one or more of these.

It is well known that alternating current is impeded by the presence of a metal in the magnetic field of the conductor. This effect is so pronounced in the cables of this type heretofore employed that they are unsuitable for carrying loads approaching the rated capacity.

In those instances where conduits have been employed to enclose the cables, the expense involved has been exceedingly great, due to both the cost of the conduits and the wages of skilled labor required to install them. They have also been attended by certain disadvantages, in that, if a conduit is laid through a crowded section, it is necessary to suspend activity while the roadway is torn up and repaved.

The cables installed without conduits, have given rise to certain difficulties that have never heretofore been surmounted. The generally accepted practice has been to encase the conductor and insulation previously applied, with a continuous sheath of lead or other metal and further enclose the whole with one or two layers of spirally wrapped band steel or other metal or metals, a sheathing of fabric wound under and over the metallic wrapping for cushioning purposes.

This invention consists in general of the provision of an electric cable intended for subterranean use but adaptable as well for submarine and aerial installation, having a protective covering that will effectively resist the deleterious effects of weathering and protect the insulated electrical conductor from mechanical injury.

It further consists in the provision of an electric cable dispensing with the customary metallic protective sheathing and windings without losing its ability to withstand natural or mechanical injury.

An object of this invention is to provide an electric cable having an outer protective covering that will effectively resist weathering.

Another object of this invention is to provide an electric cable having protective sheathing that will effectively resist mechanical injury.

Yet another object of this invention is to provide an electric cable having pliant and flexible outer protective coverings.

Still another object of this invention is to provide an electric cable having an outer protective covering that may be easily repaired.

A further object of this invention is to provide an electric cable with protective covering which has no impedance effect on the circuit in which the conductor is located.

A still further object of this invention is to provide an electric cable dispensing with the customary metallic sheathing without seriously impairing its ability to withstand natural and mechanical injuries.

Yet a further object of this invention is to provide an electric cable dispensing with the customary metallic sheathing having an outer covering that will effectively resist the deleterious effects of weathering.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing forming a part of this specification:

Figure 1:
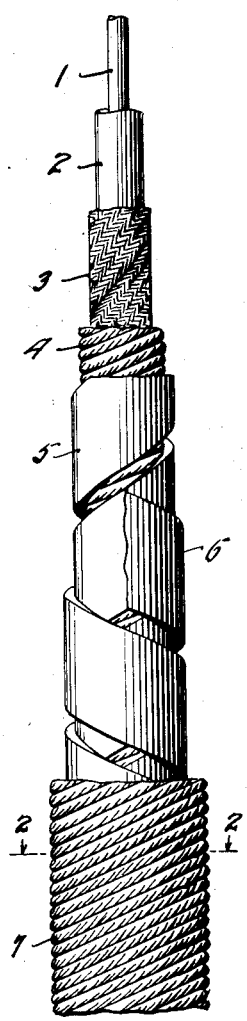
Figure 1 is an elevational view of the improved cable forming the subject matter of this invention.

Referring by numerals to the drawing wherein the same and similar elements are designated by like symbols of reference throughout, and more particularly to Figure 1, 1 is illustrative of an electric conductor composed of any suitable highly conductive material such as copper. The conductor is encased in an insulation 2 composed or rubber, paper, cambric, or any other commonly used insulating material which it may be desired to employ. A sheath of braided material or tape 3 impregnated with any suitable moisture resisting material is spirally wrapped around the insulation 2.

A jute cord 4 is helically wound around the tape or braid 3 or the insulation 2 if it is desired to dispense with the element 3. The jute layer is preferably thoroughly waterproofed with a saturation of asphaltum compound, paraffin or any other suitable substance, and is adapted to afford protection to the insulation 2.

A plurality of layers of non-metallic protective strips 5 and 6 are helically wound around the jute layer 4 in crisscross relation, adapted to lend protection to the conductor.

The use of this type of protective covering in the place of the metallic bands heretofore used, is adapted to reduce the weight as well as the cost, and remove the likelihood of current losses, without materially affecting the cable's ability to withstand mechanical or natural injury.

It must be borne in mind that the strips 5 and 6 must be made of material sufficiently strong to protect the conductor from injury such as the glancing blow of a pick or other tool used in connection with positioning the cable. I prefer to form the layers of a heavy fabric such as a suitable duck or canvas impregnated with a suitable phenol condensation product. A composition of this character affords a pliable structure which is non-inductive and non-magnetic, yet of such hardness and toughness to serve the purpose of protecting the conductor as previously stated.

The phenol condensation product used should be of sufficient hardness to lend the maximum protection without being so hard as to have the undesirable properties of brittleness.

A layer of jute cord 7 is adapted to be helically wound over the windings 5 and 6 after being first thoroughly saturated with any other suitable material, to insure moisture-proof fiber.

The completed cable may be treated with powdered chalk, soapstone or other similar substance to prevent adhesion when it is wound on a wheel.

This covering of jute is designed to lend pliancy.

Figure 3:
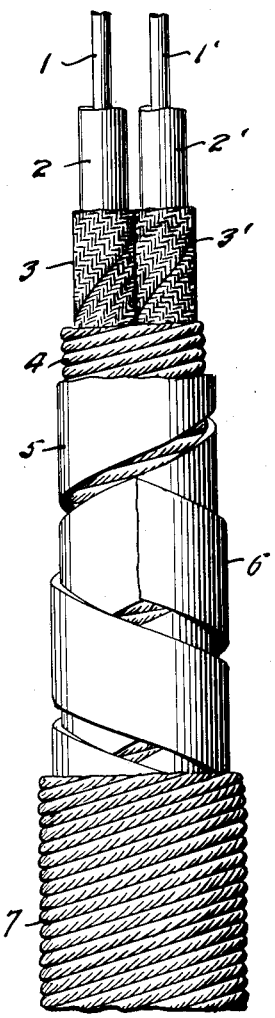
Figure 3 is an elevational view showing a modification of the cable shown in Figure 1.

The covering previously described may be applied through a plurality of conductors 1 and 1' as shown in Figure 3 having an insulating sheath 2 and 2' similar to the sheath 2, wrapped with tape or fabric 3 and 3'.

Figure 4:
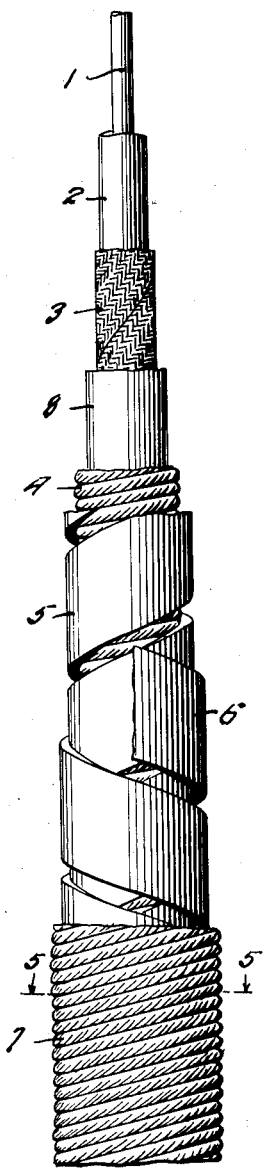
Figure 4 is an elevational view showing a modification of the cable shown in Figure 1.
Figure 2:
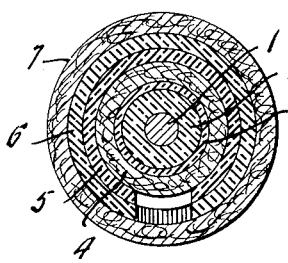
Figure 2 is a top view taken on line 2—2 of Figure 1.
Figure 5:
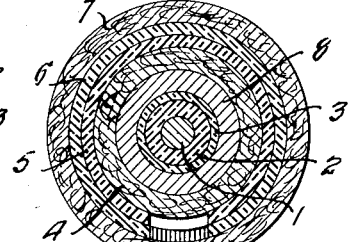
Figure 5 is a top view taken on line 5—5 of Figure 4.

If it is so desired a metallic sheath 8 may be encased around the tape or braid 3 as shown in Figures 4 and 5.

There is accomplished by this invention an improved electric cable adaptable to submarine and aerial use as well as a ground connection provided with a pliant and flexible outer waterproof covering made to afford ample protection against mechanical injury, as well as the deleterious effects of weathering and which precludes the formation of transformer loops and guards against magnetic induction.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim as my invention:

1. An electric cable comprising a plurality of conductors, and a plurality of protective strips impregnated with a phenol condensate resulting in strips of stiff bendable non-metallic, non-conducting material said strips being helically wound in crisscross relation surrounding the conductors.

2. An electric cable comprising a conductor and a plurality of armor strips impregnated with a phenol condensate resulting in strips of stiff bendable non-metallic, non-conductive material, said strips being helically wound in criss-cross relation around the conductor.

3. An electric cable comprising a conductor surrounded by insulation, water-proofing material surrounding said insulation and a plurality of protective strips impregnated with a phenol condensate resulting in strips of stiff bendable, non-metallic, non-conductive material, said strips being helically wound in criss-cross relation surrounding the water-proofing material.

In testimony whereof I affix my signature.

CARL P. BRODHUN.